(12) United States Patent
Gaither et al.

(10) Patent No.: US 8,387,053 B2
(45) Date of Patent: Feb. 26, 2013

(54) METHOD AND SYSTEM FOR ENHANCING COMPUTER PROCESSING PERFORMANCE

(75) Inventors: Blaine D. Gaither, Fort Collins, CO (US); Verna Knapp, Fort Collins, CO (US); Jerome Huck, Cupertino, CA (US); Benjamin D. Osecky, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1611 days.

(21) Appl. No.: 11/626,922

(22) Filed: Jan. 25, 2007

(65) Prior Publication Data

US 2008/0184194 A1    Jul. 31, 2008

(51) Int. Cl.
*G06F 15/00*    (2006.01)
*G06F 9/30*     (2006.01)
*G06F 9/40*     (2006.01)
*G06F 7/38*     (2006.01)
*G06F 9/00*     (2006.01)
*G06F 9/44*     (2006.01)
*G06F 9/46*     (2006.01)

(52) U.S. Cl. ........ 718/102; 718/100; 718/106; 712/205; 712/206; 712/207; 712/220; 712/233; 712/234; 712/237

(58) Field of Classification Search .................. None
See application file for complete search history.

(56) References Cited

U.S. PATENT DOCUMENTS

| | | | | |
|---|---|---|---|---|
| 6,415,356 B1 * | 7/2002 | Chaudhry et al. | ............ | 711/118 |
| 6,604,125 B1 * | 8/2003 | Belkin | ............ | 718/104 |
| 7,441,101 B1 * | 10/2008 | Steiss et al. | ............ | 712/205 |
| 2003/0023663 A1 * | 1/2003 | Thompson et al. | ............ | 709/108 |
| 2004/0093591 A1 * | 5/2004 | Kalogeropulos et al. | ...... | 717/155 |
| 2005/0071572 A1 * | 3/2005 | Nakashima et al. | .......... | 711/137 |
| 2005/0138628 A1 * | 6/2005 | Bradford et al. | ............. | 718/107 |
| 2006/0090039 A1 * | 4/2006 | Jain et al. | ....................... | 711/137 |
| 2007/0094453 A1 * | 4/2007 | Santhanakrishnan et al. | ............................. | 711/137 |
| 2007/0169042 A1 * | 7/2007 | Janczewski | ................... | 717/149 |

OTHER PUBLICATIONS

Ricardo Bianchini, Beng-Hong Lim, Evaluating the Performance of Multithreading and Prefetching in Multiprocessors, Journal of Parallel and Distributed Computing, vol. 37, Issue 1, Aug. 25, 1996, pp. 83-97, ISSN 0743-7315, DOI: 10.1006/jpdc.1996.0109. (http://www.sciencedirect.com/science/article/B6WKJ-45MG46B-1Y/2/83ce3bf69e2a318e389120865f5fa.*

Bob Boothe and Abhiram Ranade. 1992. Improved multithreading techniques for hiding communication latency in multiprocessors. SIGARCH Comput. Archit. News 20, 2 (Apr. 1992), 214-223. DOI=10.1145/146628.139729    <http://doi.acm.org/10.1145/146628.139729>.*

* cited by examiner

*Primary Examiner* — Emerson Puente
*Assistant Examiner* — Charles Swift

(57) ABSTRACT

A method of performing operations in a computer system, computer system, and related method of compilation, are disclosed. In one embodiment, the method of performing includes providing compiled code having at least one thread, where each of the at least one thread includes a respective plurality of blocks and each respective block includes a respective pre-fetch component and a respective execute component. The method also includes performing a first pre-fetch component from a first block of a first thread of the at least one thread, performing a first additional component after the first pre-fetch component has been performed, and performing a first execute component from the first block of the first thread. The first execute component is performed after the first additional component has been performed, and the first additional component is from either a second thread or another block of the first thread that is not the first block.

20 Claims, 5 Drawing Sheets

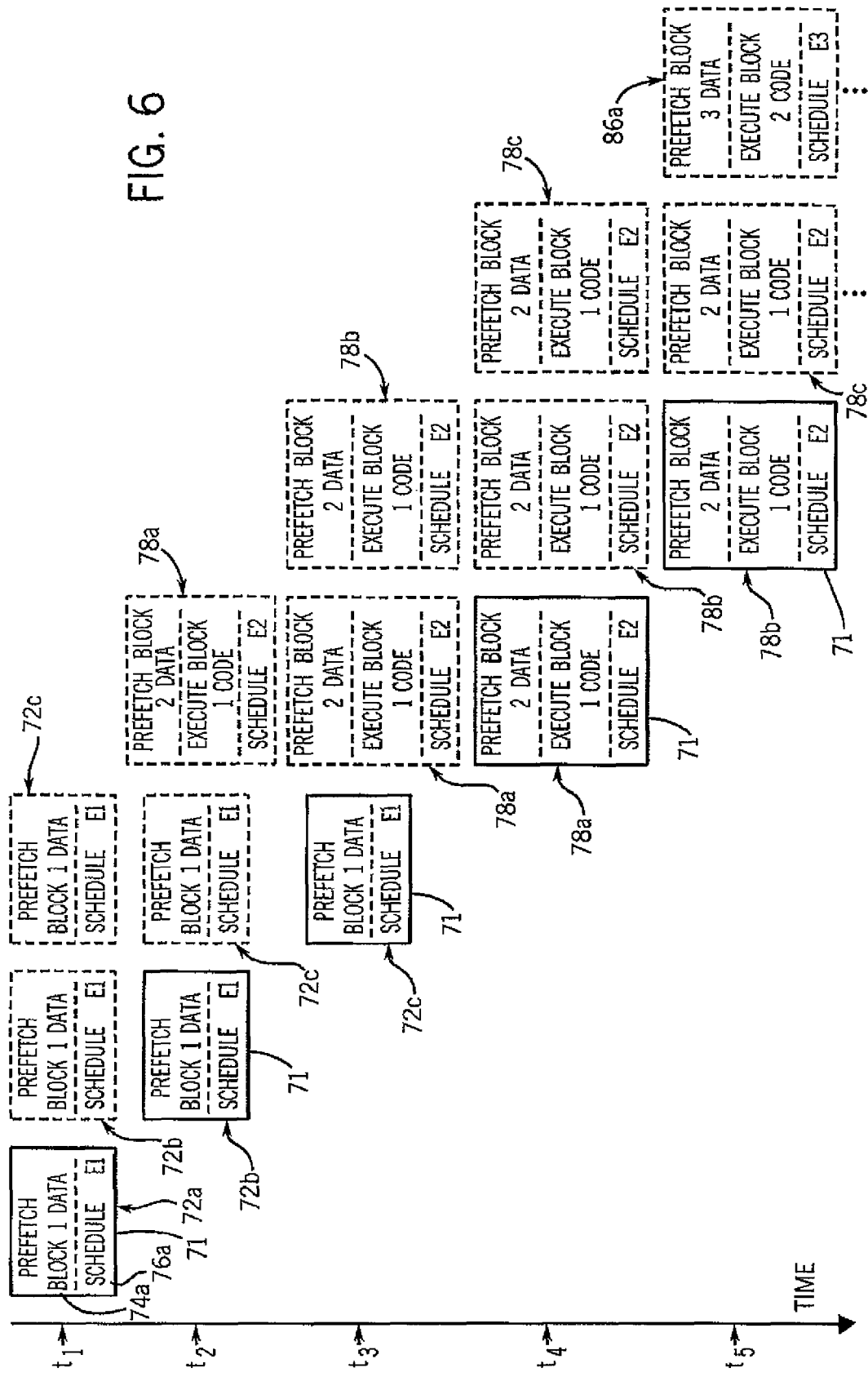

METHOD AND SYSTEM FOR ENHANCING COMPUTER PROCESSING PERFORMANCE

CROSS-REFERENCE TO RELATED APPLICATIONS

--

STATEMENT REGARDING FEDERALLY SPONSORED RESEARCH OR DEVELOPMENT

--

FIELD OF THE INVENTION

The present invention relates to methods and systems for computer processing and, more particularly, to methods and systems for enhancing computer processing by coordinating interactions between computer processors and memory devices.

BACKGROUND OF THE INVENTION

Many computer systems now operate by way of multi-threaded applications. Languages in which multithreading is often used, such as JAVA, also have become widespread. Further, computer processing devices such as the UltraSPARC T1 microprocessor available from Sun Microsystems, Inc. of Santa Clara, Calif. have demonstrated that multi-threaded applications can run well when implemented by way of temporal multi-threading ("TMT"), which is also known as switch-on-event multithreading ("SoEMT"). Other computer processing devices, such as the Itanium or Itanium 2 processors (e.g., the Montecito processor) available from Intel Corp. also of Santa Clara, Calif., likewise are capable of employing SoEMT, albeit typically with fewer threads. Usage of such multithreading techniques can improve the operation of computer systems in various manners. For example, TMT attempts to improve performance by allowing a hardware (HW) thread that is waiting on memory to free the hardware core and run another virtual CPU (another HW thread) instead, which allows for a better utilization of the CPU core's resources.

Although conventional computer processing devices can achieve enhanced performance due to their implementation of multithreaded applications or other multithreading techniques, such computer processing devices nevertheless are limited in their performance. For example, with respect to the aforementioned UltraSPARC T1 microprocessor in particular, while that microprocessor commonly performs relatively large numbers of threads simultaneously, the performance on any single thread is relatively slow because of the large number of threads running on a single core of the CPU (e.g., if 4 threads are being executed on a 1 GHz machine, each thread is running at 0.25 GHz). In essence the designs of these machines are skewed so far toward multithreaded operation that the machines cannot quickly or efficiently execute a lone thread. That is, the architecture of these machines is highly slanted toward execution of high numbers of software (SW) threads operating on many HMW threads, but does not result in efficient performance of smaller numbers of SW threads or a single SW thread.

In comparison, the Itanium processors deploy fewer numbers of HW threads to achieve better throughput while allowing single threads to run at full speed. That is, higher processing speeds can be achieved by such processors due to the reduced number of threads being executed by the processors. Although the high processing speeds that can be achieved by such processors is desirable, it is not uncommon for the processors to stall on memory due to the relatively long memory latency experienced by the processors when accessing memory. Additionally, even though the Itanium architecture includes prefetch instructions that allow a compiler to fetch data ahead of when it will be needed without blocking the HW thread execution, it is often the case that prefetching cannot be done enough in advance to cover the latency of the memory subsystem to avoid stalling. Consequently, such stalling can result in an increase in the experienced Cycles Per Instruction (CPI) metric.

For at least these reasons, therefore, it would be advantageous if an improved method and system for computer processing could be developed that achieved enhanced speeds of operation and/or throughput. More particularly, it would be advantageous if such improvements could be achieved in relation to microprocessors that implement multithreading.

BRIEF SUMMARY OF THE INVENTION

At least some embodiments of the present invention relate to computer processing systems and methods that combine multithreading with enhanced prefetching, in which the prefetching of data is performed earlier relative to the execution of instructions that use the prefetched data than is the case in conventional systems and methods. The enhanced prefetching is achieved in at least some such embodiments by inserting code from other threads in between the prefetching and execution operations of a given thread, and results in a system/method that achieves the advantages of highly multi-threaded HW designs without sacrificing single thread performance.

More particularly, the present invention relates to a method of performing operations in a computer system. The method includes providing compiled code having at least one thread, where each of the at least one thread includes a respective plurality of blocks and each respective block includes a respective pre-fetch component and a respective execute component. The method also includes performing a first pre-fetch component from a first block of a first thread of the at least one thread, performing a first additional component after the first pre-fetch component has been performed, and performing a first execute component from the first block of the first thread. The first execute component is performed after the first additional component has been performed, and the first additional component is from either a second thread or another block of the first thread that is not the first block.

In at least some additional embodiments, the present invention relates to a computer system that includes at least one memory device, and a processing device coupled at least indirectly to the memory device. The processing device includes, or is configured to perform a program that serves as, one or both of a scheduler and a compiler. When the scheduler is present, the scheduler operates to schedule performances of a plurality of execute components of a plurality of blocks of at least one thread in relation to a plurality of pre-fetch components corresponding to the respective blocks in a manner so that a plurality of additional components are performed in between the performances of the respective execute components and respective pre-fetch components. When the compiler is present, the compiler operates to compile source code into object code having the at least one thread with the plurality of blocks having the plurality of execute components and the plurality of pre-fetch components, where at least some of the components of some of the blocks are interleaved with at least some of the components of others of the blocks.

Additionally, in at least some further embodiments, the present invention relates to a method of compiling programming code. The method includes obtaining source code, and compiling the source code into object code having a plurality of source code blocks and a plurality of steps. Each of the source code blocks includes a respective pre-fetch component, a respective schedule component, and a respective execute component. Also, the respective pre-fetch component and the respective execute component of each respective source code block are respectively included within different ones of the steps.

BRIEF DESCRIPTION OF THE DRAWINGS

FIG. 6 is a flow chart illustrating in more detail the interleaving (and order for performing) the components of the multiple threads of FIG. 5.

DETAILED DESCRIPTION OF THE PREFERRED EMBODIMENT

Figure 1:
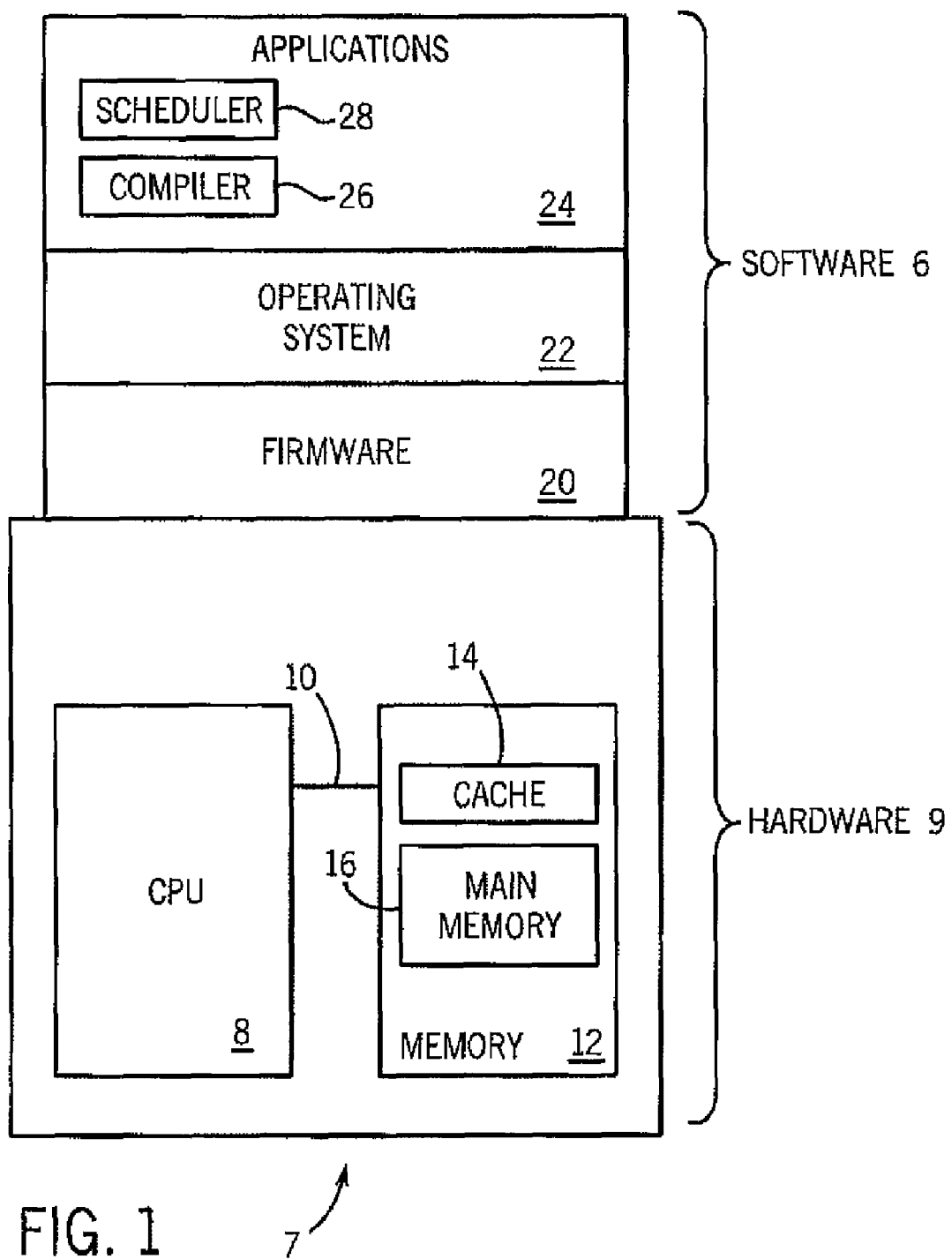
FIG. 1 is a block diagram showing exemplary hardware and software components of an exemplary computer system.

Referring to FIG. 1, components of an exemplary computer system 7 include hardware components 9 and software components 6. As shown, the hardware components 9 include a processing device or central processing unit (CPU) 8 that is coupled by way of one or more communication links 10 to one or more memory devices 12. In the present embodiment, the CPU 8 is a microprocessor, for example, an Itanium or Itanium 2 microprocessor or an UltraSPARC T1 microprocessor as mentioned above. However, in other embodiments, the CPU 8 can take other forms (e.g., a programmable logic device (PLD)). Also, while the present embodiment shows the single CPU 8, in alternate embodiments, multiple CPUs or processing devices can be employed rather than just a single CPU.

The internal communication link(s) 10 can be a bus, for example, a McKinley-type bus often utilized with the Itanium microprocessors mentioned above, or a variety of other types of networks or other links. As for the memory devices 12, these can include, for example, cache memory 14 and main memory 16 as shown. In at least some embodiments, the main memory 16 includes random access memory (RAM). Although not shown in FIG. 1, in further embodiments, the computer system 7 can also include additional components among its hardware components 9 including, for example, input/output ports and other components.

As for the software components 6, in the present embodiment these include firmware 20, an operating system 22 (albeit there can also be more than one operating system) and one or more applications 24. As illustrated, the operating system 22 communicates with the CPU 8 by way of the firmware 20, and the operating system 22 supports the applications 24, possibly by way of an application program interface (not shown). Among the applications 24 are included a compiler 26 that is capable of compiling source code for programs into object code, and a scheduler 28 that is capable of performing scheduling operations in which blocks/steps of multiple threads are interwoven with one another, as will be described in further detail below. In at least some embodiments, the source code can be legacy object code.

Figures 2, 3:
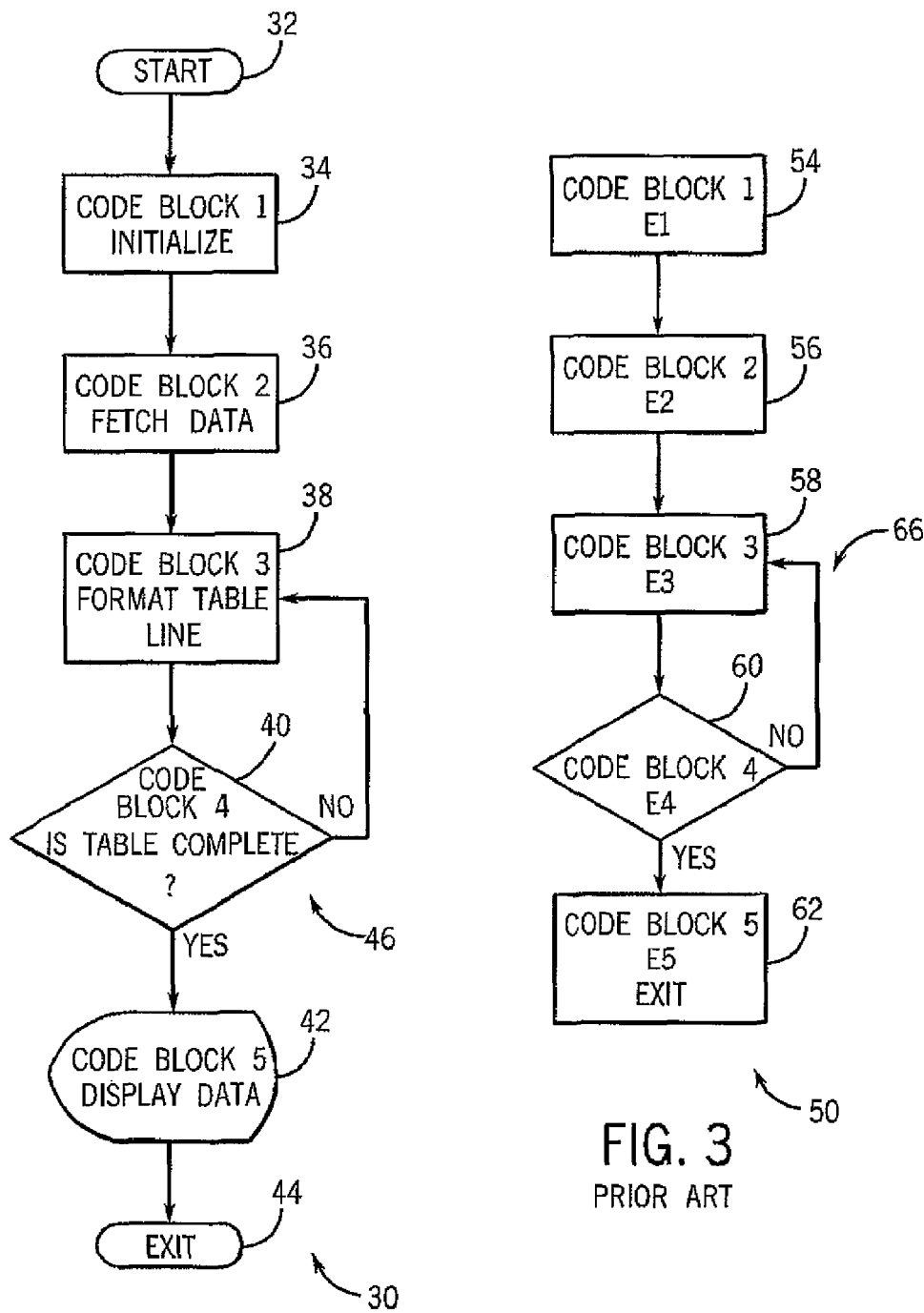
FIG. 2 shows an exemplary flow chart representing exemplary source code for an exemplary program that can be performed by the computer system of FIG. 1.
FIG. 3 is a flow chart illustrating exemplary object code that could be generated by compiling the source code of FIG. 2 in a conventional (Prior Art) manner.
Figure 4:
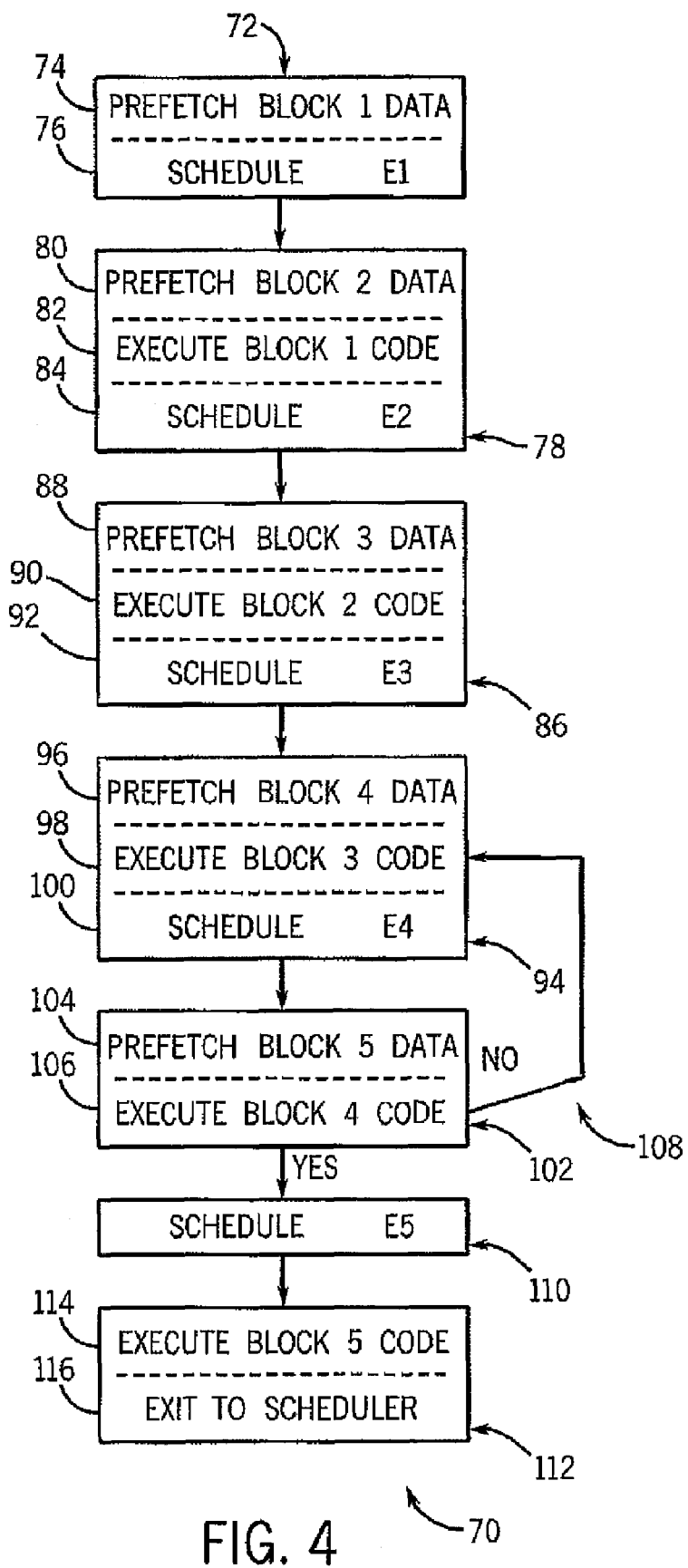
FIG. 4 is a flow chart that, in contrast to that of FIG. 3, illustrates exemplary object code that can be generated by compiling the source code of FIG. 2 in an improved manner, in accordance with at least one embodiment of the present invention, such that the object code includes a thread having blocks with multiple components that are interleaved with one another.

In particular with respect to the scheduler 28, although for convenience it is shown as an application in FIG. 1, the scheduler need not be an application. Rather, in at least some embodiments, the scheduler (or a portion thereof) can be considered to be a part of the operating system 22. Also, in at least some other embodiments, the scheduler 28 can be considered to be part of the runtime application environment, and not of necessity part of the operating system 22. Further, in at least some embodiments, the scheduler 28 includes merely a few instructions that are inserted by the compiler 26, that is, the scheduler need not be code located in a single place. In at least some further embodiments, the scheduler 28 can be considered to have multiple (e.g., two) parts. In such embodiments, one of the parts of the scheduler 28 is a part of the operating system 22 and decides what applications and what threads are executing where. A second of the parts of the scheduler 28 is more finely grained, and is likely to be implemented in the hardware 9 of the CPU 8 or, alternatively, embedded in the code generated by the compiler 26 (e.g., run within a single hardware thread). This second part of the scheduler has the function of determining when all the code and data for advancement of a thread is present in the processor and gating the thread as being in condition for taking the next execution step. If some part of the thread is missing, control is relinquished to some other thread that does have all of its data and code ready for the next step. Turning to FIGS. 2-4, first, second and third flow charts 30, 50 and 70, respectively, are shown. The first flow chart 30 shown in FIG. 2 is intended to be representative of steps of an exemplary program or application (e.g., one of the applications 24 of FIG. 1) that can be performed by a computer system such as the computer system 7 of FIG. 1. In contrast to the flow charts 50 and 70, which represent object (e.g., compiled) programming code, the flow chart 30 is representative of exemplary source code (e.g., in the form of pseudocode) corresponding to an exemplary program/application, prior to the source code being compiled by a compiler such as the compiler 26 of FIG. 1.

More particularly, in the present embodiment, the flow chart 30 is intended to be representative of a simple program that, when performed, allows for the displaying of a table. Nevertheless, the flow chart 30 is also intended to be representative of other programs that are capable of performing a variety of other functions. Indeed, the flow chart 30 is only provided for purposes of showing one exemplary program, and the present invention is not intended to be limited in application with respect to this particular program, but rather is intended to be applicable to all or nearly all programs.

As shown, in the present example, the flow chart 30 includes an initial starting step 32 that is in turn followed by an initialization step 34 corresponding to an initial or first block of programming code. Next, at a step 36, a second block of programming code is designed to fetch data for incorporation into the table. Then, at a step 38, a third block of programming code determines how lines of the table will be formatted to include portions of the data that are fetched according to the step 36. Further, at a step 40, a fourth block of programming code determines whether the table as formatted in the step 38 is complete. If not, the routine returns to the step 38, such that steps 38 and 40 form a loop 46. If, however, it is determined at the block 40 that the table has been completed, then the process advances to a step 42 at which the table and data included within the table is displayed according to a fifth block of code. The routine then ends at a step 44.

The first flow chart 30 of FIG. 2 represents an exemplary set of operations that can be performed in a variety of ways by the CPU 8 depending upon how the program is compiled and then eventually executed by the CPU. In this regard, the second flow chart 50 of FIG. 3 represents a compiled version of the source code of FIG. 2 after it has been compiled in a conventional (Prior Art) manner, e.g., compiled into object code. As shown, after being compiled in a conventional manner, the resulting object code of the flow chart 50 includes five blocks of code represented by five successive steps 54, 56, 58, 60 and 62, respectively. More particularly, first, second, third, fourth and fifth steps 54, 56, 58, 60 and 62 respectively contain first, second, third, fourth and fifth blocks of object code that correspond respectively to the pre-compiled code of steps 34, 36, 38, 40 and 42 of the flow chart 30, respectively. Also, just as the loop 46 exists in the flow chart 30 of FIG. 2 involving the steps 38 and 40, likewise, a loop 66 exists between the steps 58 and 60 of the flow chart 50 of FIG. 3.

In contrast to the flow chart 50 of FIG. 3, the third flow chart 70 of FIG. 4 represents a compiled version of the source code of FIG. 2 after it has been compiled in a different manner than that which resulted in the flow chart 50, in accordance with at least one embodiment of the present invention. More particularly, the flow chart 70 is intended to be representative of object code resulting from a compilation technique that allows and facilitates multi-threaded operation of the computer system 7/CPU 8. Such multi-threaded operation by the computer system 7/CPU 8 is speedier and more efficient than conventional manners of processing, such as that which would be afforded by implementing the object code represented by the flow chart 50.

More particularly, the flow chart 70 of FIG. 4 is intended to be representative of programming code that has been compiled in a manner such that multiple software (SW) threads can be performed in an interleaved manner within a single hardware (HW) thread. Additional FIGS. 5 and 6 discussed below in particular show explicitly the performance of multiple SW threads. However, for simplicity, rather than showing multiple threads, FIG. 4 initially illustrates in schematic form how various components of blocks of a single thread can be interleaved with one another and still perform operations that result in the same table displaying function as is achieved by performing the object code of FIG. 3. That is, FIG. 4 is intended to illustrate in a general manner an interleaving process that is applicable either to a single thread or to multiple threads, but which provides the greatest benefit when multiple threads are implemented.

As shown by FIG. 4, the flow chart 70 illustrates a single thread of object code having blocks that correspond to the steps of the flow chart 30 and are capable of resulting in a table displaying function. More particularly, the flow chart 70 includes five thread blocks 1-5 that respectively correspond, in terms of their intended operation, to the steps 34, 36, 38, 40 and 42 of the flow chart 30, respectively. Further as shown, each block of the thread represented by the flow chart 70 can be respectively broken into three components, namely, a "pre-fetch" component, a "schedule" component and an "execute" component, such that each block can be referred to as a triple having three components (P,S,E). Given that the different thread blocks are broken into the pre-fetch, schedule and execute components, it is possible to interleave these different components of the different blocks 1-5 of the thread represented by the flow chart 70 with one another. Various combinations of the interleaved components are shown as steps within the flow chart 70. Also, in at least some embodiments, each triple can be efficiently embedded inline in the generated compiler code. Alternatively, rather than implementing the triples entirely in the compiler code, the triples (or portions thereof, e.g., the schedule components of the triples) can be implemented in hardware or as an operating system call.

As already mentioned above, it is the blocks 1-5, the components of which are interleaved among one another, rather than the steps of the flow chart 70, which correspond to the steps of the flow chart 30 of FIG. 2. More particularly, the blocks 1, 2, 3, 4 and 5 of FIG. 4 correspond respectively to the steps 34, 36, 38, 40 and 42 of FIG. 2. The pre-fetch component of a given block, when performed, results in an attempt to pre-fetch data from memory (e.g., from the main memory 16) that is to be used in performing the compiled code that is associated with the execute component of that block. Typically, all of the prefetched information is inserted into the cache 14, and at least a portion of the prefetched information is provided directly to the CPU 8 (or a CPU register). In comparison, performance of the execute component of a given block results in execution of the compiled code associated with that block, and thus results in performance of a corresponding operation. The compiled object code associated with a given block typically corresponds to a particular operation or step defined by a block of the uncompiled source code. For example, the compiled object code associated with the execute component of the block 1 of the flow chart 70 results in performance of an initialization function corresponding to the step 34 of the flow chart 30.

As for the schedule component of a given block, when performed, this component results in scheduling (e.g., determining the order or time of performance) of one or more components relative to other components to be performed. Typically, although not necessarily, a schedule component of a given block results in the scheduling of the execute component of that block relative to the pre-fetch component of that block, and/or relative to other components of other blocks. Also, in some embodiments, a schedule component of a given block will cause the scheduling of the pre-fetch component of the next successive block. As described in further detail below, the flow chart 70 of FIG. 4 in particular shows an exemplary interleaving of components of thread blocks, in which the respective schedule component of each thread block schedules the execute component of that respective block.

More particularly as shown in FIG. 4, the flow chart 70 begins with a first step 72 that includes first and second substeps 74 and 76. The first substep 74 is the pre-fetch component associated with the block 1 of the thread represented by the flow chart 70 (again, this block 1 corresponds to the first block of the source code of FIG. 2 associated with the step 34). When this pre-fetch component is performed by the computer system 7, an attempt is made to pre-fetch data necessary for performing the compiled code associated with the execute component of the block 1. As for the second substep 76, that substep is the schedule component of the block 1, and determines the order/time of performance for the execute component of the block 1. In scheduling this execute component, the scheduler 28 (see FIG. 1) can operate in various ways. For example, the schedule can place the address of the execute component at the end of a scheduling first-in first-out (FIFO) data structure or other data structure.

Next, at a second step 78 of the flow chart 70, first, second and third additional substeps 80, 82 and 84 are performed. As shown, the first additional substep 80 concerns a pre-fetch component designed to pre-fetch data to be used in performing the execute component of the block 2 of the thread. Subsequently, the second additional substep 82 is the execute component of the block 1, where the ordering of this execute component in relation to the pre-fetch component of the substep 80 was determined by the schedule component of the substep 76 discussed above. That is, as determined by the schedule component of the substep 76, it is only after the performance of the pre-fetch component of the substep 80 that the execute component of the substep 82 can be performed. As for the third additional substep 84, this is the schedule component of the block 2 of the thread, which schedules the relative order/time of performance for the execute component of the block 2.

Subsequent steps 86 and 94 of the flow chart 70 are analogous to the step 78 in that each of the steps 86 and 94 includes a set of three respective substeps including a pre-fetch component substep, an execute component substep and a schedule component substep. More particularly, the step 86 includes a substep 88 that is the pre-fetch component for the block 3, a substep 90 that is the execute component for the block 2 (the order of this component having been scheduled by the schedule component of the substep 84), and a substep 92 that is a schedule component for scheduling the execute component of the block 3. Likewise, the step 94 includes a substep 96 that is the pre-fetch component for the block 4, a substep 98 that is the execute component for the block 3 (the order of this component having been scheduled by the schedule component of the substep 92), and a substep 100 that is a schedule component for scheduling the execute component of the block 4.

Notwithstanding the similarity of the steps 78, 86 and 94, subsequent steps 102, 110 and 112 of the flow chart 70 differ somewhat in their form, largely because the flow chart 70 reflects the loop 46 of the flow chart 30 as well as the fact that the flow chart 30 ends following the fifth step 42. More particularly, the step 102 performed subsequent to the step 94 of the flow chart 70 includes two substeps 104 and 106, where the substep 104 is the pre-fetch component of the block 5 of the thread, and the substep 106 is the execute component of the block 4 of the thread, as scheduled in the substep 100 mentioned above. Further as shown, the substeps 98, 100, 104 and 106 of the steps 94 and 102 form a loop 108 corresponding to the loop 46 of the flow chart 30. That is, if a particular condition is not met during the performance of the substep 106 (e.g., a condition indicating that the table is complete), the operation of the computer system 7 returns from the substep 106 to the substep 98, at which the compiled code of the block 3 of the thread (which corresponds to the third step 38 of the flow chart 30) is again executed. If the condition is met during the performance of the execute component of the substep 106, then the process advances to the step 110, at which the execute component of the block 5 of the thread is scheduled. Finally, subsequent to the step 110, a final step 112 is performed including a first substep 114 that is the execute component of the block 5 (as scheduled in the substep 110), and a substep 116 at which the thread ends, by exiting to the scheduler 28 (which can involve calling the operating system 22).

As mentioned above, in at least some embodiments, the scheduler 28 can be understood to encompass at least two parts. One part is based upon (or encompassed as part of) the software forming the operating system 22. This part of the scheduler 28 decides what threads are executing on the CPU 8 (or CPUs). Another part can be embedded in the hardware 9 and determines when all the data and code is available to execute on the CPU 8. In such embodiments, the compiler 26 generates code to trigger the prefetches, generates more code to schedule execution, and generates still additional code to actually execute application steps. Preferably, to accomplish this in a rapid, efficient manner, the compiler 26 cooperates with a portion of the hardware 9. Such cooperation is desirable since it is the hardware 9 that detects memory stalls and, upon detecting such stalls, puts another thread that is not stalled into execution.

The flow chart 70 of FIG. 4 represents how, in at least one embodiment of the present invention, object code corresponding to the source code represented by the flow chart 30 of FIG. 2 can be compiled by a compiler of a computer system (e.g., the compiler 26 of the computer system 2) and then executed by the computer system. That is, the thread represented by the flow chart 70 constitutes an exemplary ordering of components of the blocks 1-5, which are performed in the order of the steps/substeps as shown, as determined by a compiler such as the compiler 26. From the flow chart 70 of FIG. 4, it should be evident that, in accordance with at least some embodiments of the present invention, operation of a computer system in performing compiled programming code corresponding to several steps or programming blocks involves not only execution of programming code corresponding to those blocks, but also pre-fetching of data necessary for the execution of that programming code as well as scheduling of the execution of that programming code, where the pre-fetching, execution and scheduling tasks (particularly those of different blocks) are interleaved with one another.

The use of interleaved pre-fetch, execute, and schedule components as described above is advantageous. In many instances, the operation of memory devices such as the memory devices 12 (particularly the main memory 16) is considerably slower than the operation of the CPU 8 or other processing device(s) such that memory latency exists. However, by pre-fetching data corresponding to the execution of various programming blocks prior to the execution of those programming blocks, the information necessary for performing those compiled programming blocks is more likely to be immediately available to the CPU 8 (or other processing device(s)) by the time that it is ready to execute those compiled programming blocks. Thus, due to the interleaving of programming components as described above with respect to FIG. 4, the accessing of data from the memory devices is much less likely to present an effective bottleneck limiting the processing throughput of the CPU/processing device(s) than is the case when using conventional object code such as that represented by FIG. 3.

In order for the interleaving of the execute and pre-fetch components to most effectively alleviate the delays associated with the accessing of the memory devices, it is often desirable (or even necessary) that the time interval between the pre-fetch component of a given thread block and the related execute component of that block exceed the typical memory accessing time (e.g., 75 ns to hundreds of ns). It is for this reason that, in the present embodiment, each respective substep of the flow chart 70 that involves a pre-fetch component for a given block (e.g., the steps 74, 80, 88, 96 and 104) is separated from the respective substep involving an execute component for that given block (e.g., the steps 82, 90, 98, 106 and 114), typically by way of one or both of a pre-fetch component and an execute component associated with one or more other programming blocks as well as by the schedule component of that given block). For example the pre-fetch component of the block 2 in the substep 80 is separated from the corresponding execute component of the substep 90 by each of the execute component for the block 1 in the substep 82, the schedule component for the block 2 in the substep 84 and the pre-fetch component for the block 3 in the step 88.

Further, although in the embodiment of FIG. 4, the pre-fetch and execute components associated with any given programming block are only separated by at most a single execute component, schedule component and pre-fetch component (e.g., in between the substeps 80 and 90, there are the additional substeps 82, 84 and 88), in alternate embodiments any number of additional components could separate any given pair of pre-fetch and execute components of a particular programming block. Indeed, in many embodiments, the pre-fetch and execute components of a particular programming block will be separated by numerous execute components as well as possibly numerous pre-fetch components and/or schedule components (albeit, in at least some embodiments, the amount of prefetching that can be implemented may be limited by the space in which the code and prefetched data can be stored). This can be particularly advantageous where the typical memory access time is relatively large, and becomes possible particularly when components from multiple threads are interleaved, as discussed below with reference to FIGS. 5 and 6.

Figure 5:
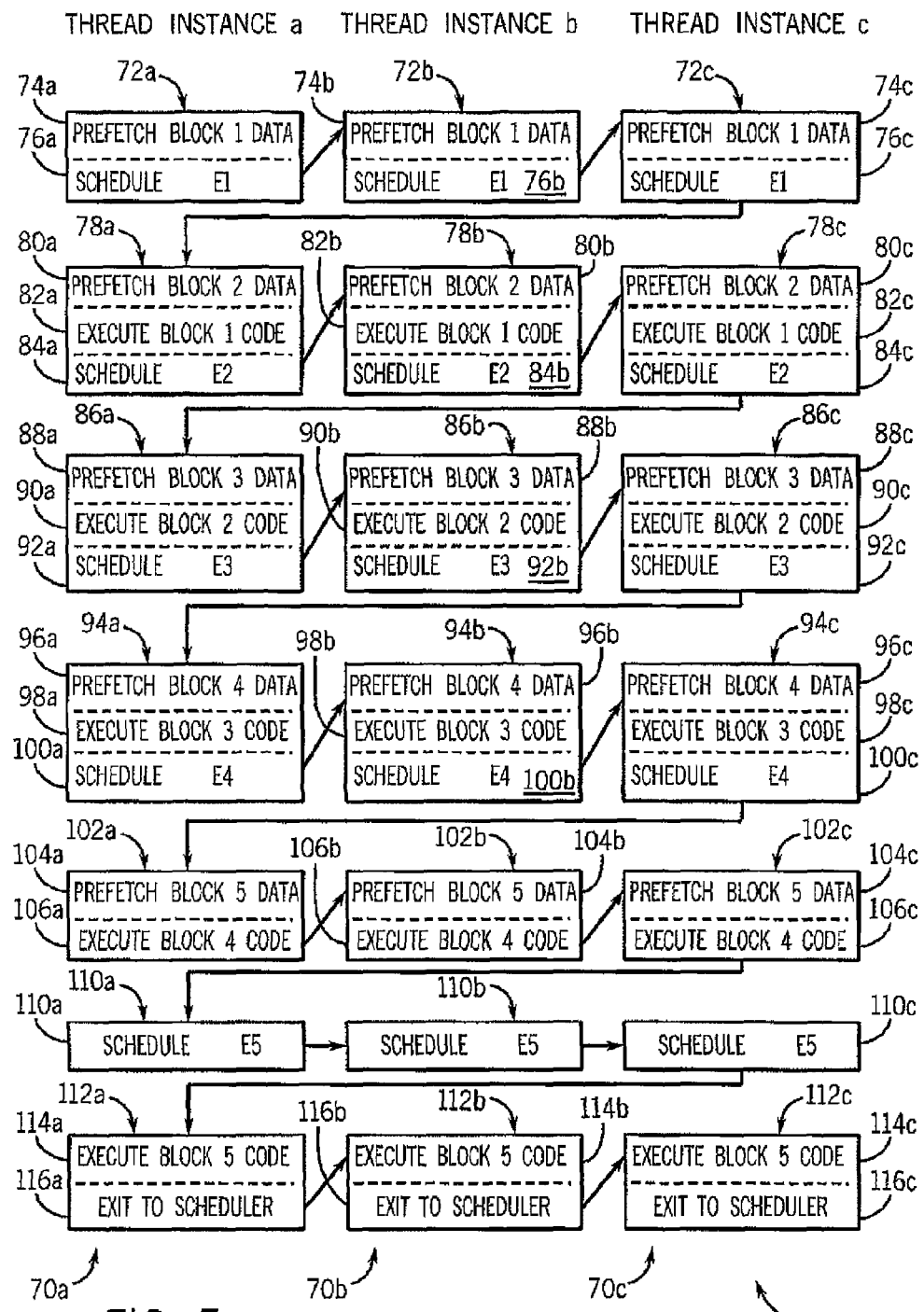
FIG. 5 is a flow chart showing an exemplary set of multiple threads, similar to the thread of FIG. 4, where components of the multiple threads are interleaved with one another, in accordance with at least one embodiment of the present invention.

Turning then to FIGS. 5 and 6, another exemplary embodiment of compiled programming (object) code, in which the code includes multiple threads, is shown as a flow chart 71. Referring particularly to FIG. 5, the flow chart 71 in this embodiment includes three threads a, b, and c that are represented respectively by three respective flow chart segments 70a, 70b and 70c. In the present example, as is evident from a comparison of the steps/substeps of each of the flow chart segments 70a, 70b and 70c with those of the flow chart 70 of FIG. 4, each of the flow chart segments is a separate instance of the thread of the flow chart 70. That is, the flow chart 71 in the present embodiment is made up of three threads that each have the same steps/substeps as one another, namely, the steps/substeps of the thread of the flow chart 70.

More particularly as shown, the flow chart segment 70a has steps/substeps 72a-116a, which respectively correspond to the steps/substeps 72-116 of the flow chart 70. Likewise, the flow chart segment 70b has steps/substeps 72b-116c that respectively correspond to the steps/substeps 72-116, and the flow chart segment 70c has steps/substeps 72c-116c that respectively correspond to the steps/substeps 72-116 (although, for simplicity of description, in the present example none of the flow chart segments 70a-70c has a loop corresponding to the loop 108 of FIG. 4). While the flow chart 71 in the present embodiment is made up of the three flow chart segments 70a-70c that each have the same steps as one another and as the flow chart 70, it should be understood that the flow chart 71 is only intended to be exemplary, and that the present invention is intended to encompass numerous embodiments of compiled code that involve multiple threads that are neither the same as one another, nor instances of the same, shared, underlying thread. The present exemplary flow chart 71 of FIG. 5 employs multiple threads that are all instances of the same thread of FIG. 4 merely to facilitate a description of an embodiment of multi-threaded object code herein.

Since each of the three flow chart segments 70a-70c is an instance of the flow chart 70 of FIG. 4, the manner of inter-leaving of the steps/substeps and corresponding pre-fetch, schedule and execute components of each particular thread a, b and c, when viewing each individual thread independently, is identical to that of the flow chart 70 in FIG. 4. For example, in the flow chart 71, the substep 80a involving the pre-fetch component of the block 2 of the thread a is separated from the substep 90a involving the execute component of the block 2 by way of the additional substeps 82a, 84a and 88a involving the execute component of the block 1 of the thread a, the schedule component of the block 2 of that thread, and the pre-fetch component of the block 3 of that thread. Likewise, the substeps 80b, 80c are respectively separated from the substeps 90b, 90c by the sets of substeps 82b, 84b, 88b and 82c, 84c, 88c, respectively.

Yet, although the steps/substeps of each respective thread a, b and c of the flow chart 71 are performed in the same relative order as the steps/substeps of the flow chart 70 of FIG. 4, this is not to say that performance of the steps/substeps of the flow chart 71 involves sequential completion of all of the steps/substeps of a given thread/flow chart segment prior to performance of the steps/substeps of another of the threads/flow chart segments. Rather, as shown in FIG. 5, the performance of the steps/substeps of the flow chart 71 occurs in a "round robin", alternating, or cyclic manner among the threads a, b and c (corresponding to the flow chart segments 70a, 70b and 70c) such that, before proceeding from a given step of a given thread to the next step of that thread, a step from each of the other threads is performed first. For example, the step 72a of the thread a of the flow chart 71 is not followed immediately by the step 78a of that thread, but rather the step 72a is followed by the step 72b of the thread b, which is in turn followed by the step 72c of the thread c, and it is only after the step 72c has been performed is the step 78a performed.

In general, the performance of steps of the compiled code for the three threads a, b and c therefore is according to the following pattern: aP1S1, bP1S1, cP1S1, aP2E1S2, bP2E1S2, cP2E1S2 . . . aP(N+1)E(N)S(N+1), bP(N+1)E(N)S(N+1), cP(N+1)E(N)S(N+1). In this expression, a, b, or c denotes the thread of a given step, P, E or S indicates a pre-fetch, execute or schedule component (or substep) within the given step, and a number or variable N or N+1 indicates the block of the thread to which the component (or substep) pertains. More specifically, the sequence of steps (substeps) in performing the flow chart 71 is as follows: 72a (74a,76a), 72b (74b,76b), 72c (74c,76c), 78a (80a,82a,84a), 78b (80b, 82b,84b), 78c (80c,82c,84c), 86a (88a,90a,92a), 86b (88b, 90b,92b), 86c (88c,90c,92c), 94a (96a,98a,100a), 94b (96b, 98b,100b), 94c (96c,98c,100c), 102a (104a,106a), 102b (104b,106b), 102c (104c,106c), 110a, 110b, 110c, 112a (114a,116a), 112b (114b,116b) and 112c (114c,116c). The respective substeps 116a, 116b and 116c end the respective SW threads of the flow chart segments 70a, 70b and 70c.

Given this round robin manner of performing steps/substeps of the various threads, the interleaving of steps/substeps thus takes on an additional aspect when the compiled code provided by the compiler 26 includes multiple (in this example, three) threads. That is, when multiple threads are performed by the computer system 2 as in the present embodiment, not only are the pre-fetching, schedule and execute components of different blocks of a given thread interleaved among one another, but also the pre-fetching, schedule and execute components of different threads are interleaved among one another. By interleaving the components of multiple threads among one another, it is easier to separate the respective execute component of a given block of a given thread from the corresponding pre-fetch component of that block and thread, since the space in between those pre-fetch and execute components can be filled with multiple other pre-fetch, execute and/or schedule components that are associated with that given thread and/or with other threads.

Thus, by interleaving the components of multiple threads in accordance with at least some embodiments of the present invention, it is possible to achieve with more regularity desired operation in which the respective pre-fetch components of given blocks and threads are separated from their corresponding execute components by sufficient time differentials as to allow for the accessing of the main memory 16 (or other memory devices) without delaying the processing by the CPU 8. That is, the presently-described manner of compiling object code in which the components of multiple threads are interleaved with one another allows for better amelioration of the latency issue often facing processing devices in their interaction with memory devices, in comparison with conventional manners of compiling and performing code. It should be further noted that, although such interleaving of components/tasks of multiple threads is shown, in circumstances where multiple threads are not present (e.g., there is a reversion to only a single thread), then the manner of operation can return to single-threaded operation that can involve some interleaving of components of different blocks of the single thread (e.g., as discussed with respect to FIG. 4), or even not involve interleaving at all (e.g., as in conventional manners of operation).Referring further to FIG. 6, in addition to showing the order in which the various steps of the threads a, b and c of the flow chart 71 are performed, that figure also illustrates the manner in which the CPU 8 will typically perform the steps of the flow chart. As shown, operation according to the flow chart 71 begins with the performance of the step 72a including the substeps 74a and 76b. While this step 72a is being performed by the CPU 8, however, the steps 72b and 72c are already scheduled in queue to be performed subsequent to the step 72a (as scheduled by the scheduler 28, e.g., by thread scheduling code running on the CPU 8 as discussed above). Thus, at a time $t_1$, the step 72a is performed while the steps 72b and 72c are held in queue. (It should be noted that, to distinguish the steps being performed (e.g., step 72a at time $t_1$) from the steps held in the SW thread scheduling queue (e.g., steps 72b and 72c at time $t_1$) in FIG. 6, the boxes for the former are outlined in solid lines while the boxes for the latter are shown in dashed lines.)

Next, at a time $t_2$, the step 72b is performed. As this occurs, the step 72c is moved up in the queue such that it is second in line for being performed, while the step 78a of the thread a is entered into the queue behind the step 72c. Subsequently, at a time $t_3$, the step 72c is performed while the step 78a moves up in the queue and the step 78b is added to the queue. Further, at a time $t_4$, the step 78a is performed with the steps 78b and 78c being in queue and, at a time $t_5$, the step 78b is performed with the steps 78c and 86a being in queue. Subsequently, the remaining steps of the flow chart 71 are subsequently queued and processed in like manner, in accordance with the round robin processing of the steps of the three threads a, b and c.

From the above description of the performance and queuing of the steps of the flow chart 71 of FIGS. 5 and 6, it should be noted that this manner of performance and queuing, although not entailing vector processing, nevertheless bears some resemblance to vector processing. In vector processing loops of code are unrolled and operations are performed on vectors that are out of order from what the program specifies. By executing a single vector, the same operation from a variety of loop instances is executed in one operation. That is, multiple operations from different loop instances are executed at once, where the multiple operations are all the same type of operation. Similarly, in the above-described embodiment of the present invention, several threads are unrolled and pieces of the different threads are interleaved.

Although in the present embodiment, the steps of the three threads a, b and c are interleaved and processed in a round-robin manner, the manner in which steps and substeps of different threads can be interleaved and processed can vary depending upon the embodiment. For example, the manner of interleaving and processing in alternate embodiments can take on a different, less regular pattern in embodiments where the multiple threads are not instances of the same program but rather differ from one another and have differing numbers and/or types of steps and substeps. In multi-threaded embodiments in which there are only two threads, or more than three threads, the manner of interleaving and processing can also vary.

Depending upon the embodiment, threads can be dynamically added to or removed from an overall process encompassing multiple threads such as that represented by the flow chart 71. For example, in one alternate embodiment, even though the process might at one time encompass only the three threads a, b and c, at a later time it is possible that a fourth thread d would be added to the process, in which case steps of that fourth thread would be interleaved with the existing steps of the existing threads, Although in the present embodiment of FIGS. 5-6 each of the threads a, b and c has an identical number of steps, in other embodiments where the threads have differing numbers of steps, some threads can be completed before others are completed, In such cases, when old threads are finished, new threads can be scheduled at any time. Also, in various embodiments, when old threads finish, the schedule has a SW interface (e.g., the substeps 116a-c mentioned above) to allow new threads to be started and run on the ring (e.g., be incorporated into the above-described round-robin arrangement).

In performing multithreaded processes such as that of FIGS. 5 and 6, the manner by which the CPU 8 keeps track of the various threads, particularly the current steps of the various threads that are being executed (or the most recently-performed steps), can depend upon the embodiment. In at least some embodiments, the states of the various threads are stored in registers. One manner of using registers involves saving the states of threads repeatedly into dedicated registers. For example, in some embodiments the threads can be saved and restored on systems with a few registers such as the IBM 360 available from IBM Corporation of Armonk, N.Y. This system has sixteen general purpose registers and four floating point registers. When implementing multiple threads as described above on this type of system, it is appropriate to save and restore registers between thread switches.

In another embodiment, systems with rotating registers can be employed to store the states of the different threads. With respect to rotating registers implemented in the Itanium microprocessor in particular, these registers are typically part of the register file. Although not a part of memory, in at least some cases the rotating registers can be saved to memory by the Register Save Engine of Itanium. Typically, during operation the states of threads in execution are held so that the threads do not clash on register allocation, so as to facilitate the generation of code. The rotating registers allow each thread to see its register file at a seemingly fixed location. That is, the registers form a ring such that each thread has a group of registers, and the rotating registers allow the thread to see its registers at the

We claim:
1. A method of performing operations in a computer system, the method comprising:

providing compiled code including a first thread, a second thread, and a third thread, wherein each of the first, the second, and the third threads include a respective plurality of blocks and each respective block includes a respective data pre-fetch component and a respective instruction execute component;

performing a first data pre-fetch component from a first block of a first thread prior to performing a first instruction execute component from a block prior to the first block of the first thread;

performing a first additional component after the first data pre-fetch component from the block of the first thread has been performed; and performing a first instruction execute component from a first block of the third thread, wherein the first instruction execute component from the first block of the third thread is performed after the first additional component has been performed and after a second data pre-fetch component from a second block of the third thread has been performed, and wherein the first additional component is from either the second thread or another block of the first thread that is not the first block.

2. The method of claim 1, wherein the first additional component is either an additional instruction execute component or an additional data pre-fetch component, and the first thread is a software (SW) thread.

3. The method of claim 1, wherein the first additional component is from the second thread.

4. The method of claim 3 wherein, in addition to the performing of the first additional component, a second additional component is also performed in between the performing of the first data pre-fetch component from the first block of the first thread and the performing of the first instruction execute component from the first block of the third thread.

5. The method of claim 4, wherein at least one of the following is true:
(a) the second additional component is associated with the first thread, and is a second data pre-fetch component from a second block of the first thread;
(b) the second additional component is from the first thread, and is a second instruction execute component of the first block of the first thread; and
(c) the second additional component is also from the second thread.

6. The method of claim 3, wherein the at least one thread includes at least one further thread in addition to the first, second, and third threads.

7. The method of claim 3, further comprising:
performing of the first data pre-fetch component from the first block of the first thread and a first further component;
performing of the first additional component and a second further component; and
performing of the first instruction execute component from the first block of the third thread and a third further component.

8. The method of claim 7, wherein the first data pre-fetch component from the first block of the first thread and a first further component is performed before the first data pre-fetch component from the first block of the second thread is performed, and the first instruction execute component from the first block of the third thread and a third further component is performed after first data pre-fetch component from the first block of the second thread is performed, and wherein performing of the first additional component and a second further component are from the second thread.

9. The method of claim 3, wherein rotating registers are employed to store states of the respective threads being executed.

10. The method of claim 9, wherein a scheduler causes the rotating registers to position such that each respective thread is executed with a respective one of the registers that is appropriate for that respective thread.

11. The method of claim 1, further comprising at least one of:
(a) performing a schedule component in between the performing of the first data pre-fetch component from the first block of the first thread and the performing of the first instruction execute component from the first block of the third thread, wherein the schedule component determines a relative order or time of the performing of the first instruction execute component from the first block of the third thread in relation to one or more of the first data pre-fetch component from the first block of the first thread, the first additional component or at least one other component, and
(b) compiling uncompiled code to arrive at the compiled code having a plurality of triples each including a respective data pre-fetch component, a respective schedule component and a respective instruction execute component.

12. The method of claim 1, wherein the first additional component is from the second thread, and further comprising performing a plurality of further components from the first and second threads, wherein there is repeated alternation between performing components from the first thread and performing components from the second thread.

13. The method of claim 12, further comprising performing of another component from the third thread, wherein the performing of the components of the first, second and third threads occurs in a cyclic manner.

14. A computer system comprising:
at least one memory device; and
a processing device coupled at least indirectly to the memory device, wherein the processing device includes, or is configured to perform a program that serves as, one or both of:
(i) a scheduler that operates to schedule performances of a plurality of instruction execute components of a plurality of blocks of a first thread, a second thread, and a third thread in relation to a plurality of data pre-fetch components corresponding to the respective blocks of the first thread, the second thread, and the third thread in a manner so that a plurality of additional components are performed in between the performances of the respective instruction execute components and respective data pre-fetch components, wherein the schedule operates to schedule a performance of a first additional component after a first data pre-fetch component from a first block of the first thread has been performed and a first instruction execute component from the first block of the third thread is performed after the first additional component has been performed and after a second data pre-fetch component from a second block of the third thread has been performed; and
(ii) a compiler that operates to compile source code into object code having the at least one thread with the plurality of blocks having the plurality of instruction execute components and the plurality of data pre-fetch components, wherein at least some of the components of some of the blocks are interleaved with at least some of the components of others of the blocks.

15. The computer system of claim 14, wherein the plurality of blocks includes a first plurality of blocks of the first thread, a second plurality of blocks of the second thread, and a third plurality of blocks of the third thread, and wherein first, second, and third status information regarding the first, second, and third threads is stored in the at least one memory device.

16. The computer system of claim 15, wherein the at least one memory device includes a plurality of rotating registers that store the first, second, and third status information.

17. The computer system of claim 15, further comprising firmware and additional software that enables operation of one or both of the scheduler and the compiler, and wherein the source code is legacy object code.

18. The computer system of claim 14, wherein the processing device includes a microprocessor and the at least one memory device includes at least one of a cache memory and a main memory, the main memory including random access memory (RAM).

19. A non-transitory computer-readable medium having a set of instructions stored thereon executable by a processor to:
   obtain source code; and
   compile the source code into object code having a plurality of source code threads, each thread having a plurality of source code blocks and a plurality of steps,
   wherein each of the source code blocks includes a respective data pre-fetch component, a respective schedule component, and a respective instruction execute component;
   wherein a step from each of the plurality of source code threads is performed before proceeding to a next step of a respective one of the plurality of source code threads; and
   wherein a first instruction execute component for a first source code block is performed before a second data pre-fetch component of a second source code block of a final source code thread of the plurality of source code threads and wherein a first data pre-fetch component and a corresponding first instruction execute component of the first source code block is included within a different step of one of the plurality of source code threads than a second data pre-fetch component and a second corresponding instruction execute component of the second source code block.

20. The non-transitory computer-readable medium of claim 19, wherein as a result of the compiling, the object code encompasses multiple threads, respective states of which are configured for storage within respective rotating registers.

* * * * *

UNITED STATES PATENT AND TRADEMARK OFFICE
CERTIFICATE OF CORRECTION

PATENT NO. : 8,387,053 B2
APPLICATION NO. : 11/626922
DATED : February 26, 2013
INVENTOR(S) : Blaine D. Gaither et al.

It is certified that error appears in the above-identified patent and that said Letters Patent is hereby corrected as shown below:

In the Specification

In column 1, line 60, delete "on many HMW threads," and insert -- on many HW threads, --, therefor.

In column 9, line 4, delete "For example the pre-fetch" and insert -- For example, the pre-fetch --, therefor.

In column 12, line 24, delete "the existing threads," and insert -- the existing threads. --, therefor.

In column 12, line 28, delete "before others are completed," and insert -- before others are completed. --, therefor.

In column 12, line 63, after "its registers at the" insert -- same location even though the rotating registers map to different physical registers. Further, when there are multiple sizes of blocks, the processors can assure that there are no conflicts in terms of register usage, for example, by saving and restoring or partitioning the register file.
    Also, when employing rotating registers, it typically is at least possible to run as many threads as the rotating register file will allow. The rotating file is manipulated by schedule code (e.g., schedule components) to assure that the proper physical registers are mapped to the right thread. Should it be desired or necessary to call to code that is not within the triple (P,S,E) form, this call is performed but no advantage associated with interleaving is provided during the called code (since the code that is not in triplet form will not do the prefetching needed for itself, and thus no prefetching for that code occurs during the branching to and from that code). While the untripleted code is executing, the prefetching for the tripleted code finishes and waits for the recommencement of the suspended tripleted code. Upon the return from the unthreaded code, the corresponding execute component/code of the previously-suspended tripleted code finishes. As a result there is improved throughput through the computer processing device by reducing memory wait.
    Although at least some of the embodiments discussed above involve the compilation and execution of code in the form of multiple software (SW) threads that can be performed in an Signed and Sealed this
Thirteenth Day of August, 2013

Teresa Stanek Rea
*Acting Director of the United States Patent and Trademark Office*

CERTIFICATE OF CORRECTION (continued)
U.S. Pat. No. 8,387,053 B2

In the Specification continued interleaved manner within a single hardware (HW) thread, the present invention is also intended to encompass a variety of other embodiments as well. For example, the present invention is intended to encompass embodiments in which there is only a single SW thread that is implemented as a set of interleaved components of blocks of the thread. Also for example, the present invention is intended to encompass embodiments in which there are multiple SW threads operating on multiple HW threads, or one or more SW threads operating on a CPU without any HW threads.

It is specifically intended that the present invention not be limited to the embodiments and illustrations contained herein, but include modified forms of those embodiments including portions of the embodiments and combinations of elements of different embodiments as comes within the scope of the following claims. --.

In the Claims

In column 13, line 12, in Claim 1, delete "the block" and insert -- the first block --, therefor.